July 26, 1960 A. C. SCHROEDER 2,946,846
COLOR TELEVISION
Original Filed Nov. 2, 1953
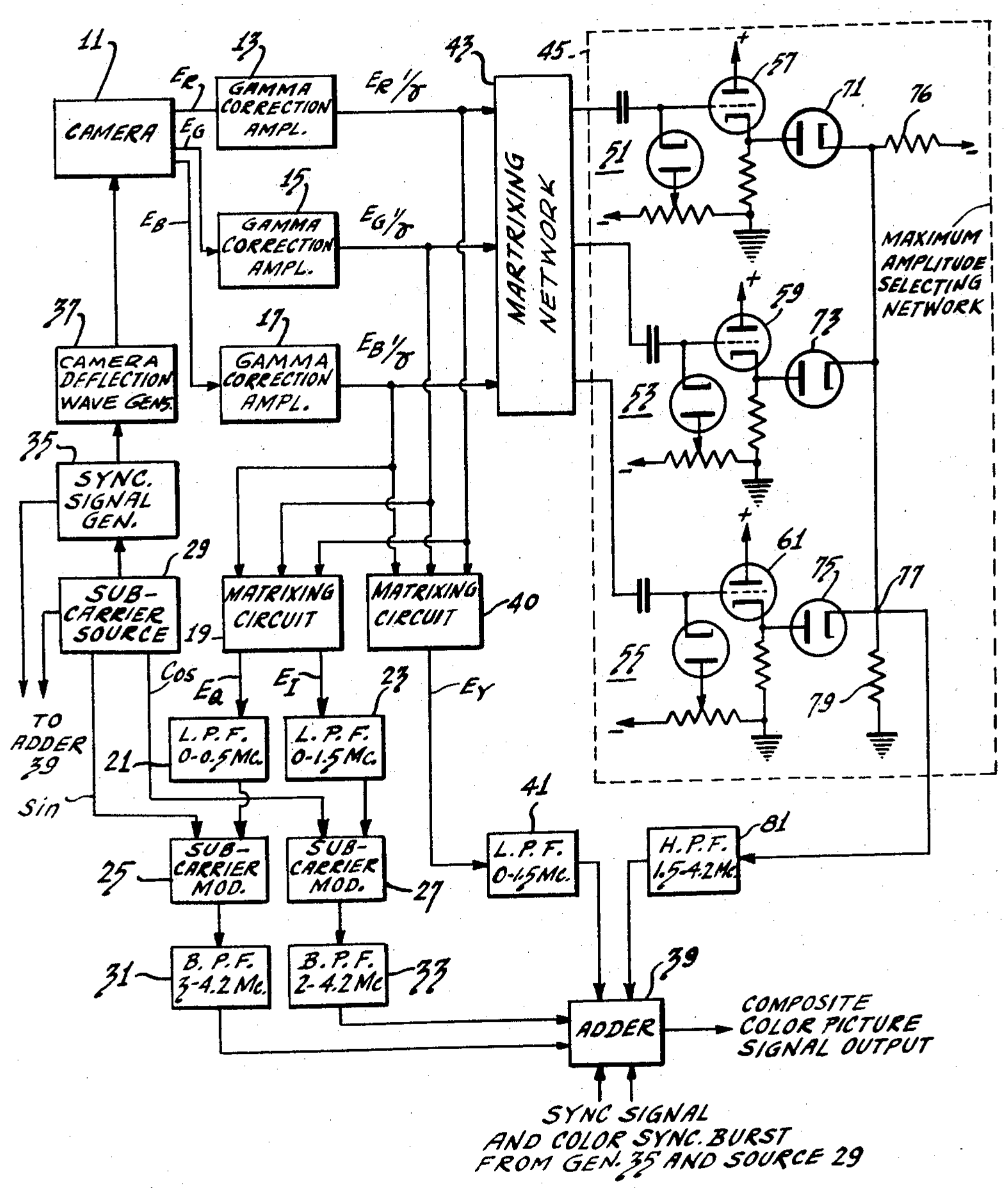
INVENTOR
ALFRED C. SCHROEDER
BY
ATTORNEY 2,946,846

COLOR TELEVISION

Alfred C. Schroeder, Southampton, Pa., assignor to Radio Corporation of America, a corporation of Delaware Original application Nov. 2, 1953, Ser. No. 389,566. Divided and this application Dec. 4, 1957, Ser. No. 700,702

6 Claims. (Cl. 178—5.4)

This application is a division of an application of Alfred C. Schroeder, filed November 2, 1953, Serial No. 389,566, entitled "Color Television."

The present invention relates to color television systems of the simultaneous subcarrier type, and more particularly to apparatus for improving the detail rendition in color television systems of this type.

In a color television system which accords with the signal specifications proposed by the National Television Systems Committee (NTSC) to the FCC for adoption as color television signal standards, color information is conveyed through the medium of a modulated subcarrier wave. In the proposed system, for color information in a limited low frequency band, the color subcarrier is both phase and amplitude modulated to permit effective three-color reproduction of relatively large picture areas. For color information in a succeeding higher frequency band, the color subcarrier is constant in phase but modulated in amplitude to permit effective two-color reproduction of the relatively small color details of the picture. As a broad band monochrome signal is transmitted along with the modulated color subcarrier, the finest picture detail is reproduced in black-and-white only.

In accordance with the constant luminance feature incorporated in the NTSC signal specifications, the broad band monochrome signal is ideally representative only of the luminance variations of the subject. The subcarrier which is modulated with so-called color-difference information ideally carries only chrominance information and has no effect on the luminance of the reproduction. In a perfectly linear system, it is correct to say that the broad band signal provided for in the signal specifications conveys all the luminance information and that the chrominance signals affect only the chromaticity. However in a system in which the respective component color signals are made non-linear for gradient correction purposes and the broad band signal comprises the sum of appropriate portions of these individually corrected component color signals, the chrominance signals do have some effect on the luminance, so that the broad band signal may no longer be said to convey all luminance information.

More specifically, the NTSC signal specifications provide that:

$$E_Y=0.30E_R+0.59E_G+0.11E_B$$

where $E_Y$ is the monochrome portion of the color picture signal and $E_R$, $E_G$ and $E_B$ are the gamma-corrected voltages corresponding to the red, green and blue signals intended for the color picture tube. It may thus be noted that the "luminance" signal $E_Y$ is not a gamma-corrected combination of the red, green and blue signals, but rather a combination of the individually gamma-corrected red, green and blue signals. If the transmitted luminance signal $E_Y$ were made up in the former manner rather than the latter, it might more properly be said that the signal represents all of the luminance information throughout the entire range of amplitudes for the luminance and chrominance signals. However a more complex receiver would be required to obtain the properly related voltages for the steps involving the combining of the luminance information and the color-difference information to obtain the proper simultaneous color signals. Thus, since the signal specifications incorporate the latter manner of formation of the luminance signal, it must be recognized that the chrominance signals do have some effect on the luminance of the color reproduction. It may be demonstrated that the contribution of the chrominance channel to the luminance of the reproduction increases with saturation of the subject colors and therefore is greatest in what may be referred to as high chroma areas of the picture.

While it thus may be readily appreciated that the desirable features of constant luminance operation are not fully realized in high chroma areas, a further problem resides in the fact that detail rendition in high chroma areas is also impaired. To more fully appreciate the reasons for this accompanying result, an examination of the makeup of the chrominance signal should now be made. The chrominance signal comprises the sum of two orthogonal components of a subcarrier wave, respectively modulated by so-called "I" and "Q" color-mixture signals. One component of the color subcarrier of a predetermined phase relative to a reference phase is modulated in amplitude by the narrow band (approximately 500 kc.) $E_Q$ signal, which is equal to $$0.41(E_B-E_Y)+0.48(E_R-E_Y)$$

and a second component of the subcarrier in phase quadrature with the first is modulated in amplitude by the moderately wide band (approximately 1.5 mc.) $E_I$ signal, which is equal to $$-0.27(E_B-E_Y)+0.74(E_R-E_Y)$$

With the color subcarrier frequency at 3.579545 mc., double sideband transmission, reception and utilization of both color mixture signals, $E_Q$ and $E_I$, up to a 500 kc. limit, is feasible to permit the aforementioned three-color reproduction of relatively large picture areas without crosstalk, while in the band of signals from approximately 500 kc. to 1.5 mc. where inherent system limitations dictate effectively single sideband transmission the single color mixture signal $E_I$ is utilized for the aforementioned two-color reproduction of relatively small color details. However, for the finest picture detail represented by signal frequencies above approximately 1.5 mc., no attempt is made to convey chrominance information, these details being satisfactorily reproduced in black-and-white only in accordance with the well-known mixed highs principle.

Thus, for very fine picture detail the receiving apparatus can utilize only the information supplied by the broad band luminance channel. If the luminance channel truly conveyed all the luminance information as would be readily possible in a linear system, the very fine detail rendition in the color reproduction would be equal to that obtained in conventional black-and-white reproductions. However, as was noted previously, due to the necessity for correcting the respective component color signals for system non-linearities and due to the fact that the luminance signal comprises an appropriately proportioned combination of these individually corrected signals, all the luminance information does not appear in the luminance channel, particularly in high chroma areas. A result necessarily is that detail in high chroma regions is deficient in its luminance component.

The present invention therefore is directed to novel methods, and apparatus therefor, for correcting this deficiency by emphasizing the highs of the monochrome signal portion of the composite color picture signal in high chroma areas. In accordance with an embodiment of the invention, the high frequency components of the monochrome signal are obtained from a network which continually selects the component color signal of the greatest amplitude.

Another factor which contributes to loss of resolution in high chroma areas in reproductions of color television signals in a simultaneous subcarrier type of system is the partial rectification by the reproducing kinescope of subcarrier components reaching the kinescope. It will be readily appreciated that emphasis of the highs in high chroma areas in accordance with the invention serves also to compensate for this additional cause of loss of resolution in such areas. It should also be noted that the improvements in detail rendition which are attributed to use of the present invention are to be observed in black-and-white reproductions of color television signals as well as color reproductions thereof.

Accordingly it is a primary object of the present invention to provide a color television system of the simultaneous subcarrier type with apparatus for improving detail rendition in color and black-and-white reproductions.

It is a further object of the present invention to provide novel apparatus for forming a luminance signal in a color television system of the simultaneous subcarrier type.

It is an additional object of the present invention to provide a color television system with improved detail rendition in highly saturated picture areas.

It is another object of the present invention to provide a novel system of high peaking in the luminance channel of a color television system. Other objects and advantages of the present invention will become readily apparent to those skilled in the art upon a reading of the following detailed description and an inspection of the accompanying drawing in which:

The single figure illustrates in block and schematic form a color television transmitting system in which the monochrome portion of the composite color picture signal is formed in accordance with an embodiment of the present invention.

Referring to this figure in greater detail, a camera 11 is illustrated as the source of three simultaneous component color signals $E_R$, $E_G$ and $E_B$. The individual component color signals are applied to respective gradient correction amplifiers or so-called gamma correction amplifiers 13, 15 and 17. The respective output signals $$E_R\frac{1}{\gamma},\ E_G\frac{1}{\gamma} \text{ and } E_B\frac{1}{\gamma}$$

are representative of the original component color signals after introduction of a compensatory non-linearity, which in conjunction with camera non-linearity provides what is essentially the complement of the ultimate image reproducer's non-linearity.

As in color television systems of the type described in the article "Principles and Development of Color Television Systems" by G. H. Brown and D. G. C. Luck, appearing in the June 1953 issue of the RCA Review, the individually gamma-corrected color signals may be applied to suitable matrixing a circuit 19, wherein the respective color signals may be combined in appropriate proportions and suitable polarities to obtain the desired color-mixture signal ouputs. In a color television system of the type disclosed in the aforementioned article and which is in accordance with the aforementioned NTSC signal specifications, the color-mixture signal outputs may comprise so-called "Q" and "I" signals of the following character:

$$E_Q=0.21E_R-0.52E_G+0.31E_B$$

and $$E_I=0.60E_R-0.28E_G+0.32E_B$$

In further accordance with such proposed systems the "Q" and "I" signals may be passed through respective low pass filters 21 and 23 having passbands of 0 to 0.5 mc. and 0 to 1.5 mc. respectively, and applied to respective subcarrier modulators 25 and 27. The "Q" signal modulates waves of subcarrier frequency supplied by the subcarrier source 29 having a predetermined phase relationship relative to some reference phase, while the "I" signal modulates waves of subcarrier frequency from source 29 which are in phase quadrature with those subject to the "Q" signal. Respective bandpass filters 31 and 33 are provided to select from the modulation products of the respective modulators 25 and 27, a narrow band, double sideband signal lying in the 3 to 4.2 mc. band and a wider band, partially single sideband signal lying in the 2 to 4.2 mc. band.

A sync signal generator 35 is conventionally provided to synchronously control the generation of scanning waves for the camera 11 in the camera deflection wave generators 37. The sync signal generator 35 is tied to the subcarrier source 29 to insure that the desired relationship between scanning and subcarrier frequencies is maintained, which tie-in relationship is generally provided by deriving the scanning synchronization signals from the subcarrer source output by suitable frequency division.

An adder 39 is provided for combining the "Q" and "I" modulated subcarrier waves and the appropriate synchronizing signals derived from the sync generator 35 and subcarrier source 29 with a broad band monochrome signal. The formation of a monochrome signal for combination with the aforementioned signals in a color television system of the type described is the particular subject of the present invention and will now be described in detail.

In addition to application of the individually gamma-corrected color signals to a matrixing circuit 19 for formation of the "Q" and "I" color mixture signals, the individually gamma-corrected color signals are also applied to an additional matrixing circuit 40 for combination thereof to obtain a so-called luminance signal $E_Y$, nominally representative of the luminance of the subject image elements. In accordance with the aforementioned NTSC signal specification and with the constant luminance feature incorporated therein, the component color signals are combined in proportion to the relative luminosities of the respective primaries, i.e.

$$E_Y=0.30E_R+0.59E_G+0.11E_B$$

It has heretofore been general practice to utilize a signal so proportioned as the entire broad band monochrome portion of the composite transmitted color picture signal. Thus the output of the matrixing circuit 40 would normally be passed through a low pass filter having a passband of 0 to approximately 4.2 mc. and combined with the other signal components in adder 39. However in accordance with the present invention, whereby as previously indicated it is desired to compensate for detail loss in high chroma areas of the picture, a Y signal so proportioned is utilized only as the low frequency component of the transmitted monochrome signal. Thus the low pass filter 41 having a passband of 0 to 1.5 mc. is provided in the Y signal path between the matrixing circuit 40 and adder 39, so that the luminosity-function proportioning of the monochrome signal makeup applies only in the range of frequencies occupied by one or both of the "I" and "Q" signals. The high frequency component of the monochrome signal is separately formed in a novel manner.

In accordance with the illustrated embodiment, a third matrixing network 43 is provided for the individually gamma-corrected color signals in addition to the previously discussed matrixing circuits 19 and 40. The matrixing network 43 is included to provide a plurality of output signals, representative of equal proportions of the respective component color signals, or different proportions thereof, or representative of predetermined mixtures thereof, which output signals may be applied to a signal comparison network 45 from comparison in amplitude and selection of the respective signal of greatest amplitude in accordance with the principles of the invention to be subsequently discussed. Desirable improvements in detail rendition have been achieved in accordance with the invention where the signals applied to the network 45 were respectively representative of the three individually corrected component color signals, without different relative adjustments in gain therefor and without mixing of portions thereof. In such instances, the so-called matrixing network 43 needs to perform no matrixing function but may serve only to provide equal gain amplifiers for the respective component color signals, or may even be omitted. However, it appears desirable to include such apparatus as the matrixing network 43 in the coupling of the component color signals to the comparison network 45, so that should image conditions, system limitations or other circumstances so indicate, relative adjustments of the respective component color signal gains or actual matrixing of the component color signals to provide predetermined color mixture signals may be achieved to avoid excessive detail-loss compensation or insufficient detail-loss compensation for particular color changes or under particular brightness conditions. For the purposes of the following description, however, whereby one may most readily arrive at an understanding of the principles of the invention it will be assumed that the matrixing network 43 supplies the comparison network 45 with three respective signals substantially corresponding to the individually corrected component color signals without different relative gain adjustments and without matrix formation of mixture signals.

In accordance with the invention the respective color signal outputs of the matrixing network 43 are applied to the signal comparison network 45 having an output terminal 77, the network 45 operating to compare in amplitude the respective color signals, and to continually select and pass to the output terminal the color signal of greatest amplitude. While conceivably other apparatus may be derived to accomplish this function, the illustrated embodiment utilizes a network quite similar to that shown in my U.S. Patent 2,646,463, filed July 18, 1951, and entitled "Apparatus for Reproducing Images in Color," wherein apparatus was provided for continually selecting the component color signal of smallest amplitude, for purposes of an entirely different nature. Thus, the respective color signals are applied to conventional D.-C. restorers or level setters 51, 53 and 55 so that any D.-C. low frequency components which may have been lost in the preceding stages may be restored. The output signals of the level setters 51, 53 and 55 are applied to respective cathode followers 57, 59 and 61. The cathodes of the cathode followers 57, 59 and 61 are coupled to a common junction, the output terminal 77, by similarly polarized diodes (thermionic or crystal) 71, 73 and 75 respectively. With the polarity of the signals applied to the cathode followers being such that the respective cathodes thereof become more positive with increase in color signal intensity, the polarity of the diodes is chosen such that the plates of the diodes are connected to the cathodes of the corresponding cathode followers.

The selection of the color signal having the highest amplitude may be explained as follows. With no color signals present, the diodes all conduct to the same degree. As the intensity of a color signal increases, the potential applied to the plate of the corresponding diode becomes more positive. The diode to which the largest color signal is applied conducts the most and the potential of all the diode cathodes drops to a value just below that of the largest color signal. This latter value is greater than the other color signals and therefore the other color signals cannot pass to the common junction, output terminal 77.

Thus it will be appreciated that the signal appearing at the output terminal 77 is continuously representative of whichever color signal is greatest at any instant. The result is that, in high chroma areas where the amplitude of one color signal may be substantially greater than the amplitude of one or both of the other color signals, the output at terminal 77 corresponds to that dominant color signal rather than corresponding to a mixture of the three signals. The output signals appearing at terminal 77 are passed through a high pass filter 81, having a passband encompassing the 1.5 to 4.2 mc. high frequency portion of the broad band generally assigned to the monochrome signal. The outputs of high pass filter 81 and low pass filter 41 are combined in adder 39 to provide the full 4.2 mc. monochrome signal, which in accordance with the invention comprises a low frequency portion (supplied through filter 41) which is the luminosity-function mixture of the color signals desired for constant luminance operation, and a high frequency portion which corresponds as previously indicated to the color signal of greatest amplitude.

The improvement in detail rendition in high chroma areas when the monochrome signal is made up in such a manner may now be more readily appreciated. As an example, let us consider the signals derived from a picture area which is predominantly a saturated blue. As has been previously noted, in high chroma areas, such as the saturated blue area chosen for illustration, some of the luminance information concerning this area necessarily appears in the chrominance channel. For signals up to 1.5 mc. this is not a problem insofar as loss of information is concerned since, at least for the "I" signal, the chrominance channel passes signal frequencies up to this limit. For signal frequencies above 1.5 mc. however, the luminance information contained in the chrominance channel is effectively lost. If the monochrome signal in the range of signal frequencies above 1.5 mc. is still made up of the luminosity-function mixture of color signals, the high frequency luminance information contained therein may be seriously deficient. If, on the other hand, the high frequency components of the monochrome signal always correspond to the color signal of greatest amplitude, the deficiency is substantially avoided. Thus, in the illustrative saturated blue area, the high frequency components of the monochrome signal would essentially comprise the high amplitude output of the blue signal source rather than a mixture signal made up of approximately 11 percent of the high amplitude blue signal, 30 percent of the low amplitude red signal and 59 percent of the low amplitude green signal.

Thus it will be seen that for high chroma areas, such as the illustrative saturated blue area, the net result of practicing the present invention is an effective peaking of the highs in the monochrome signal to make up for the loss of high frequency luminance information in the chrominance channel. However, it may be noted that in white or gray image areas where the respective component color signals are equal, the output of the signal comparison network 45 will be essentially the same as the output of the luminosity-function proportioning matrix 40. Use of the present invention thus involves no change in the appearance of the monochrome signal for white or gray image areas. Since, however, there is no loss of luminance information in the chrominance channel for white or gray image areas, the absence of effective peaking of the highs for white or gray signals is a desired result of the use of the invention. Also, it may be noted that in colored areas of low saturation, where the respective component color signals are nearly equal, the high frequency signals selected from the output of the signal comparison network 45 will be only slightly greater in amplitude than the high frequency signals which would otherwise be selected from the output of the matrix 40. Thus, the degree of effective peaking of the highs in the monochrome signal formed in accordance with the invention is observed to decrease with decrease in saturation of the image colors. This is also a desired result of use of the present invention, since as has been previously indicated the deficiency of luminance information in the monochrome signal for which it is desired to compensate increases with saturation.

I claim:

1. In a color television system including a source of a plurality of simultaneous component color signals, apparatus comprising the combination of means coupled to said source for combining all of said component color signals in relative proportions substantially corresponding to the relative luminosities of said component colors, a low pass filter coupled to said component color signal combining means, additional means coupled to said source and having an output terminal for continually selecting and passing to said output terminal the component color signal of greatest magnitude, a high pass filter coupled to said output terminal, and signal adding means coupled to said low pass and high pass filters.

2. In a color television system including a source of a plurality of simultaneous component color signals, apparatus comprising the combination of a matrixing circuit coupled to said source for forming a signal nominally representative of the luminance of the subject image from said plurality of simultaneous component color signals, signal comparing means also coupled to said source for forming a signal continually representative of the component color signal of greatest amplitude, low pass filter means coupled to said matrixing circuit, high pass filter means coupled to said signal comparing means, and means for combining the outputs of said low pass and high pass filter means.

3. In a color television system of the simultaneous subcarrier type wherein the transmitted component color picture signal includes a broad band monochrome signal, said system including a source of a plurality of simultaneous component color signals, apparatus comprising the combination of a matrixing circuit coupled to said source for combining all of said component color signals in relative proportions substantially corresponding to the relative luminosities of said component colors to form a signal nominally representative of the luminance of the subject image, signal comparison means also coupled to said source for developing a signal continually representative of the component color signal of greatest amplitude, a pair of filter means, one of said pair of filter means being coupled to said matrixing circuit and having a passband encompassing a low frequency portion of said broad band, the other of said pair of filter means being coupled to said signal comparison means and having a passband encompassing the remaining high frequency portion of said broad band, and means for combining the outputs of said pair of filter means to form said broad band monochrome signal.

4. Apparatus in accordance with claim 3 wherein said signal comparing means includes an output terminal, a plurality of signal handling devices, each of said component color signals being applied to a respective one of said plurality of signal handling devices and a plurality of diodes, each of said diodes being coupled between a respective one of said signal handling devices and said output terminal.

5. In a color television system of the simultaneous subcarrier type provided with a plurality of simultaneous component color signals, apparatus for developing a broad band monochrome signal comprising the combination of means for matrixing said plurality of component color signals to provide a first monochrome signal, additional means for matrixing said plurality of component color signals to provide a plurality of respectively different color signals, means for selecting the signal of greatest amplitude from said latter plurality of color signals, and means for combining high frequency components of said selected signal with low frequency components of said first signal to form said broad band monochrome signal.

6. Apparatus in accordance with claim 5 wherein each of said latter plurality of color signals substantially corresponds to a respective one of said plurality of simultaneous component color signals.

References Cited in the file of this patent

UNITED STATES PATENTS

| | | |
|---|---|---|
| 2,646,463 | Schroeder | July 21, 1953 |
| 2,748,190 | Yule | May 29, 1956 |
| 2,841,640 | Bartelink | July 1, 1958 |